United States Patent
Hara et al.

(10) Patent No.: US 7,724,690 B2
(45) Date of Patent: May 25, 2010

(54) INHERITANCE CONTROL METHOD OF NETWORK CONTROL DATA BETWEEN TRANSMISSION APPARATUSES AND TRANSMISSION APPARATUS USING THE SAME

(75) Inventors: Shingo Hara, Kawasaki (JP); Eiji Iida, Kawasaki (JP); Miwa Taniguchi, Kawasaki (JP); Tomoyuki Kanzaki, Kawasaki (JP); Kazuaki Nagamine, Kawasaki (JP); Toshihiro Suzuki, Kawasaki (JP); Takuma Shouji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 930 days.

(21) Appl. No.: 10/883,917

(22) Filed: Jul. 6, 2004

(65) Prior Publication Data

US 2005/0180451 A1   Aug. 18, 2005

(30) Foreign Application Priority Data

Feb. 13, 2004   (JP)   .............................. 2004-035930

(51) Int. Cl.
H04L 12/28   (2006.01)
(52) U.S. Cl. ........................ 370/258; 370/463; 709/228; 709/251
(58) Field of Classification Search ................. 370/254, 370/255, 242, 241; 455/435, 560, 41; 709/224
See application file for complete search history.

(56) References Cited

U.S. PATENT DOCUMENTS 6,832,251 B1 * 12/2004 Gelvin et al. ............... 709/224

2002/0107922 A1   8/2002   Nakamura et al.
2003/0054821 A1 * 3/2003   Kita et al. .................... 455/435

FOREIGN PATENT DOCUMENTS

| JP | 63-007051 | 1/1988 |
| JP | 2002-236630 | 8/2002 |
| JP | 2002-247109 | 8/2002 |

OTHER PUBLICATIONS

Japanese Office Action issued on Jun. 2, 2009 in corresponding Japanese Patent Application 2004-035930.

* cited by examiner

Primary Examiner—Kevin C Harper
Assistant Examiner—Semma S. Rao
(74) Attorney, Agent, or Firm—Staas & Halsey LLP

(57) ABSTRACT

To provide a transmission apparatus capable of setting the same control data to the entire child transmission apparatuses instantaneously at a time, thereby leading to improved maintenance operation and bringing about efficient maintenance and system stability. The transmission apparatus receives from a maintenance operator a designation of a parent apparatus having the control data set in advance. That control data is to be inherited to a child apparatus. The transmission apparatus determines whether any transmission apparatus has already been registered as parent apparatus in the child apparatus, and also determines whether the designated parent apparatus has already been registered as a child apparatus in the child apparatus. The transmission apparatus then requests the designated parent apparatus to transfer the control data in the designated parent apparatus to the child apparatus, when the designated parent apparatus is not registered in the child apparatus.

4 Claims, 15 Drawing Sheets

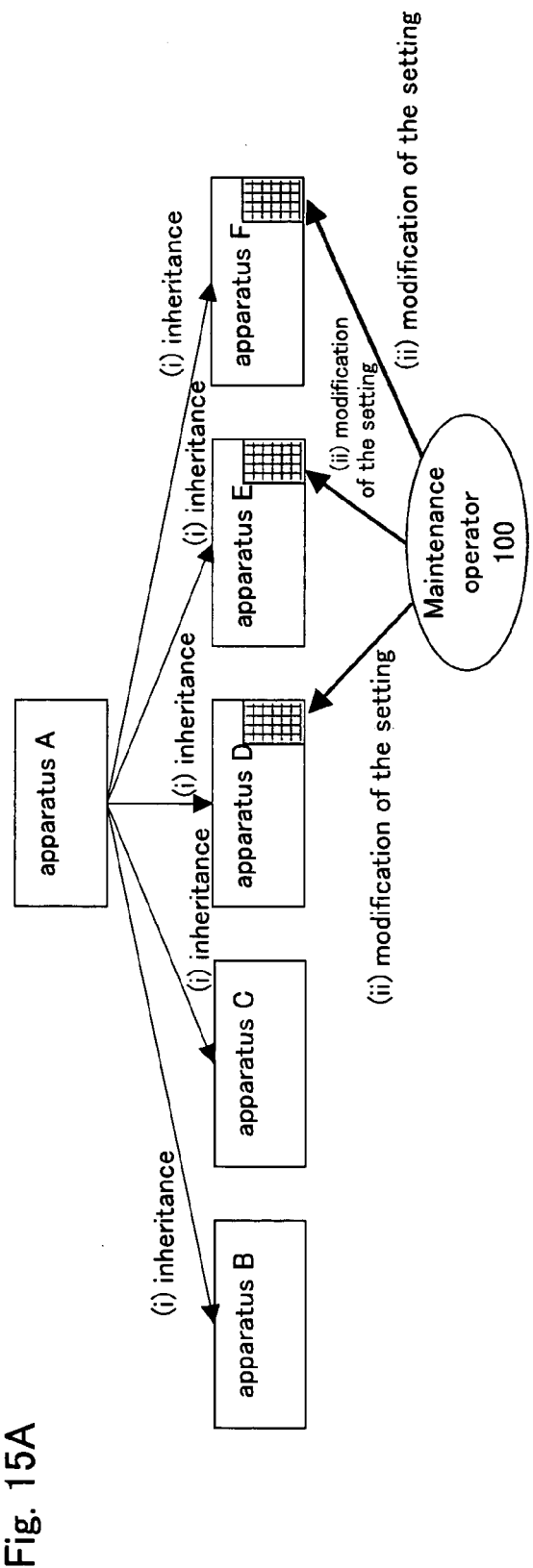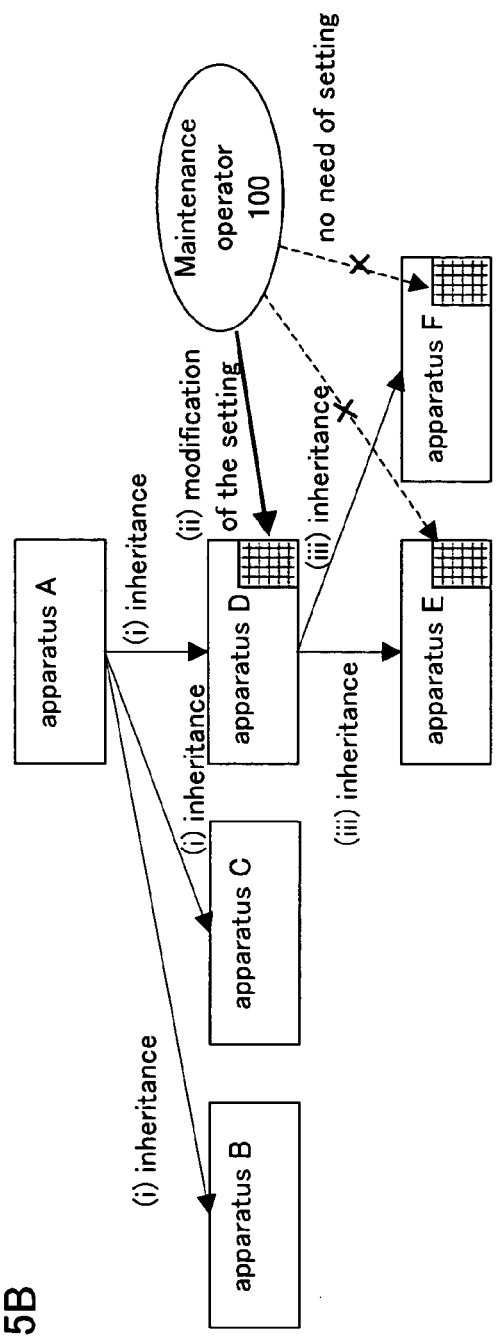
Fig. 15A
Fig. 15B

US 7,724,690 B2

INHERITANCE CONTROL METHOD OF NETWORK CONTROL DATA BETWEEN TRANSMISSION APPARATUSES AND TRANSMISSION APPARATUS USING THE SAME

FIELD OF THE INVENTION

The present invention relates to an inheritance control method of network control data among transmission apparatuses, and the transmission apparatus using the same.

BACKGROUND OF THE INVENTION

In recent years, WDM (wavelength division multiplexing) technique for transmitting by multiplexing a plurality of optical signals of different wavelengths has been put into practical use in the optical transmission technology, and the technique is increasingly advancing.

FIG. 1 shows an exemplary transmission network configuration including a plurality of WDM transmission apparatuses A-D. Each plurality of transmission apparatuses A-D is connected by a WDM ring 1 which multiplexes a plurality of optical signal shaving different wavelengths and transmits multiplexed signals.

As the technique advances, processing capacity for controlling and monitoring a multiplicity of optical signals is required in the WDM transmission apparatus (hereafter simply referred to as transmission apparatus) A-D. Also, there has been an increased amount of setup data per transmission apparatus caused by an increased number of optical signals (wavelengths). Also, the number of transmission apparatuses installed in a transmission network is increasing, because the length of WDM ring 1 is increased. With this, there is a tendency of increasing workload for setting control data necessary when initiating the transmission network or adding a new station.

Namely, as setup items of control data, there are a variety of items for network control data, such as low-speed facility types (SONET OC192, OC48, . . . Ethernet 10 Gps, 1 Gps, etc.) before multiplexing, parameters for high-speed facility (WDM) after multiplexing, cross connect, alarm (level, threshold, etc.), login user registration, network, environment monitoring (house keeping) of the station.

These setup items can be classified into (1) an item to which the same data is set throughout the entire transmission apparatuses in many cases; (2) an item to which mostly the same data is set among each transmission apparatus type, such as add/drop multiplexer and repeater; and (3) an item to which data proper to each transmission apparatus, such as the number of wavelengths, is set.

In the conventional network systems, as shown in FIG. 1, it has been necessary to set the entire network control data described in the above (1) to (3) individually to a setup data storage 122 in each transmission apparatus, from a maintenance apparatus 100, etc. under the control of a processor 121. As an amount of the setting work increases, a necessary time to start up the transmission system becomes longer, and a larger workload by a maintenance operator becomes required.

As a prior art for setting a transmission apparatus in a network system, a method for setting proper data in a distributed network has been known (The official gazette of the Japanese Unexamined Patent Publication No. S63-7051) The technique described in this patent document aims at easy setting and modification from a parent station in regard to fixed line connection, etc. A non-volatile memory is provided in a subordinate station, in which proper network data is set and retained under the instruction of a parent station.

Further, as another prior art, there is a known technique for remotely setting and modifying data relay conditions in a CATV router, thereby making it unnecessary to go to each home of individual users for setting and modification of the data (The official gazette of the Japanese Unexamined Patent Publication No. 2002-247109).

PROBLEMS TO BE SOLVED BY THE INVENTION

As described above, as WDM ring 1 tends to extend in length, the number of transmission apparatuses installed in a transmission network is increasing, showing a tendency of an increased amount of setting. Under such a trend, a larger amount of time becomes necessary for setting data into the whole transmission apparatuses throughout the network. In addition, manual work by the maintenance operator may cause an incorrect setting.

Further, in the event of a network disconnection, the maintenance operator has to go to the site of the transmission apparatus concerned for setting the data.

SUMMARY OF THE INVENTION

Accordingly, in order to solve the aforementioned problems, it is an object of the present invention to provide a method for inheriting network control data among transmission apparatuses installed in a network, and to provide the transmission apparatus incorporating the method.

According to the present invention to achieve the above-mentioned object, in a first aspect, a method for controlling inheritance of control data among a plurality of transmission apparatuses each having the control data and being connected to a network over a predetermined protocol, includes the steps of: designating a source transmission apparatus of inheritance, namely a parent apparatus, in which the control data being inherited to a target transmission apparatus of inheritance, namely a child apparatus, is set in advance; determining whether any transmission apparatus is registered as parent apparatus in the parent apparatus registration section of the child apparatus; determining whether the designated parent apparatus is registered as child apparatus in the child apparatus management table of the child apparatus; and when no transmission apparatus is registered in the parent apparatus registration section of the child apparatus and the designated parent apparatus is not included in the child apparatus management table of the child apparatus, requesting the designated parent apparatus to transfer the control data having been set therein to the child apparatus.

As a second aspect of the method to attain the aforementioned object, in the first aspect, when modifying control data set in the parent apparatus, if the control data is an object for inheritance, the parent apparatus forwards a portion of the control data having been modified to the entire child apparatuses registered in the child apparatus management table. On receipt of the control data portion having been modified, each child apparatus overwrites the received control data portion on the corresponding portion.

Further, as a third aspect of the method to attain the aforementioned object, in the first and the second aspect, when the inheritance of the control data fails because of a network failure, an inheritance failure alarm is notified to the maintenance operator. When the failure is restored, the child apparatus transmits the child apparatus management table managed by said child apparatus to the parent apparatus and the parent apparatus retransmits the control data having been set therein to the child apparatus. On completion of the retransmission, the inheritance failure alarm is cleared.

Still further, as a fourth aspect of the method to attain the aforementioned object, in the first aspect, when the parent apparatus is designated, a distinction between complete inheritance which represents the inheritance of the entire control data to be inherited from the parent apparatus and reference inheritance which represents updating only the modified portion by reference is executed.

Further, the transmission apparatus to attain the aforementioned object is disclosed. A transmission apparatus among a plurality of transmission apparatuses each having control data and being connected to a network over a predetermined protocol, includes: a processor receiving from a maintenance operator a designation of a source transmission apparatus of inheritance, namely a parent apparatus, in which the control data being inherited to a target transmission apparatus of inheritance, namely a child apparatus, is set in advance; a parent apparatus registration section retaining information as to whether any transmission apparatus is registered as parent apparatus; and a child apparatus management table retaining information as to whether the transmission apparatus coincident with the parent apparatus is registered as child apparatus. The processor determines whether any transmission apparatus is registered as parent apparatus in the parent apparatus registration section of the child apparatus, and determines whether the designated parent apparatus is registered as child apparatus in the child apparatus management table of the child apparatus, and when no transmission apparatus is registered in the parent apparatus registration section of the child apparatus and the designated parent apparatus is not included in the child apparatus management table of the child apparatus, requests the designated parent apparatus to transfer the control data having been set therein to the child apparatus.

With the above-mentioned means for solution, it becomes possible to obtain the following effects.

First, by setting apparatus data to an upper-level transmission apparatus, the same setting can be reflected instantaneously at one time to the entire transmission apparatuses subordinate to the upper-level transmission apparatus, which leads to obtaining improved maintenance operation.

Even the setting inheritance cannot be executed temporarily because of a network failure, a user (maintenance operator) can continue setting to the upper-level transmission apparatus as usual, without worrying about the network failure, and the setting can automatically be conveyed to other child (subordinate) apparatuses after the failure is restored.

The user can grasp an individual setting condition in each transmission apparatus, and when apparatus setting is modified, the user can understand which apparatus the modification may influence the setting of.

Further scopes and features of the present invention will become more apparent by the following description of the embodiments with the accompanied drawings.

BRIEF DESCRIPTION OF THE DRAWINGS

FIGS. 15A, 15B show diagrams for illustrating features and merits of inheritance operation in the embodiment shown in FIG. 11.

PREFERRED EMBODIMENTS OF THE INVENTION

The preferred embodiment of the present invention is described here in after referring to the charts and drawings. However, it is noted that the embodiments are described for the sake of better understanding of the present invention, and that the scope of the present invention is not limited to the embodiments described below.

Figure 2:
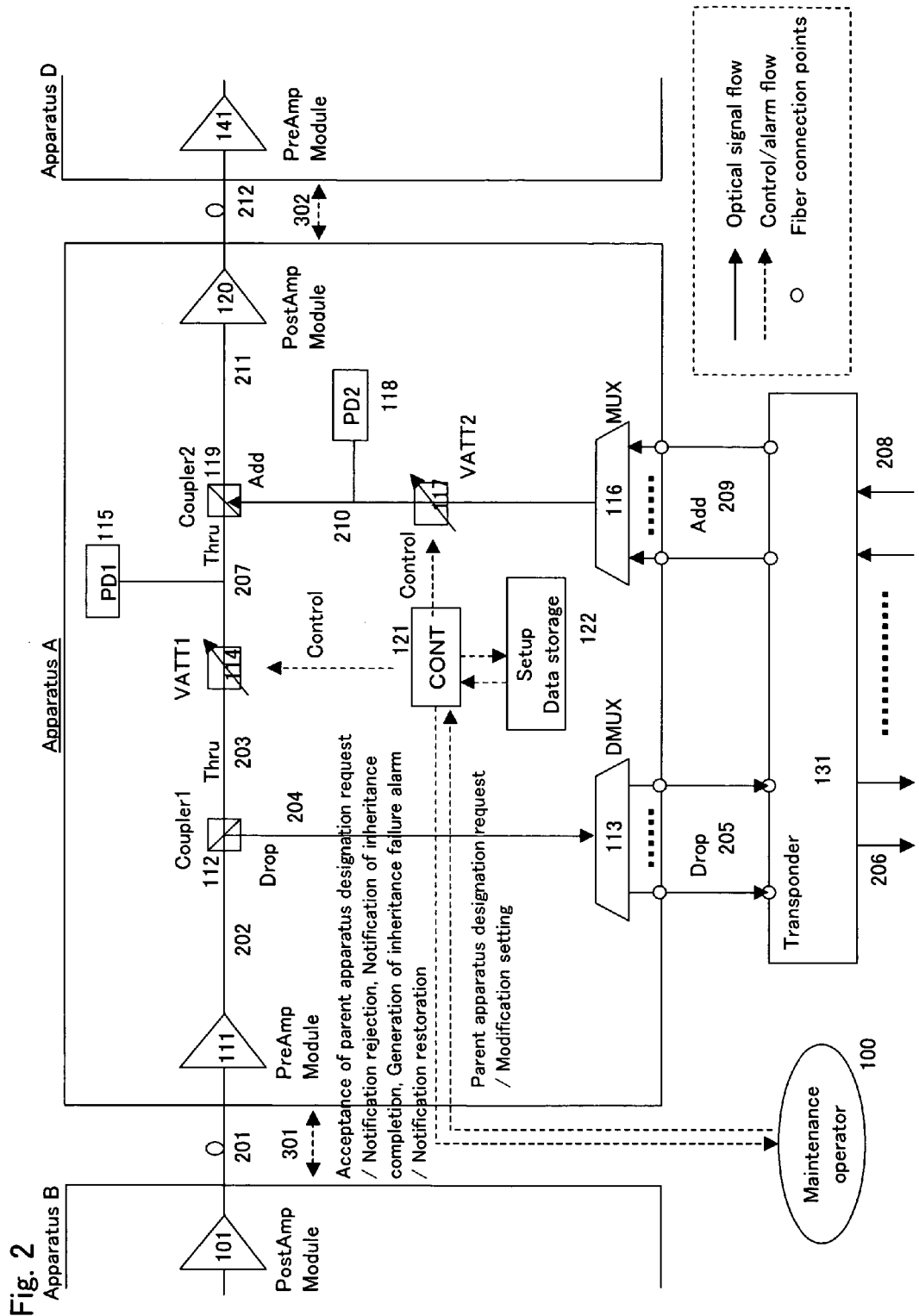
FIG. 2 shows an exemplary configuration block diagram of a transmission apparatus placed in a network to which the method of the present invention is applied.

FIG. 2 shows an exemplary configuration block diagram of a transmission apparatus placed in a network to which the method of the present invention is applied.

Figure 1:
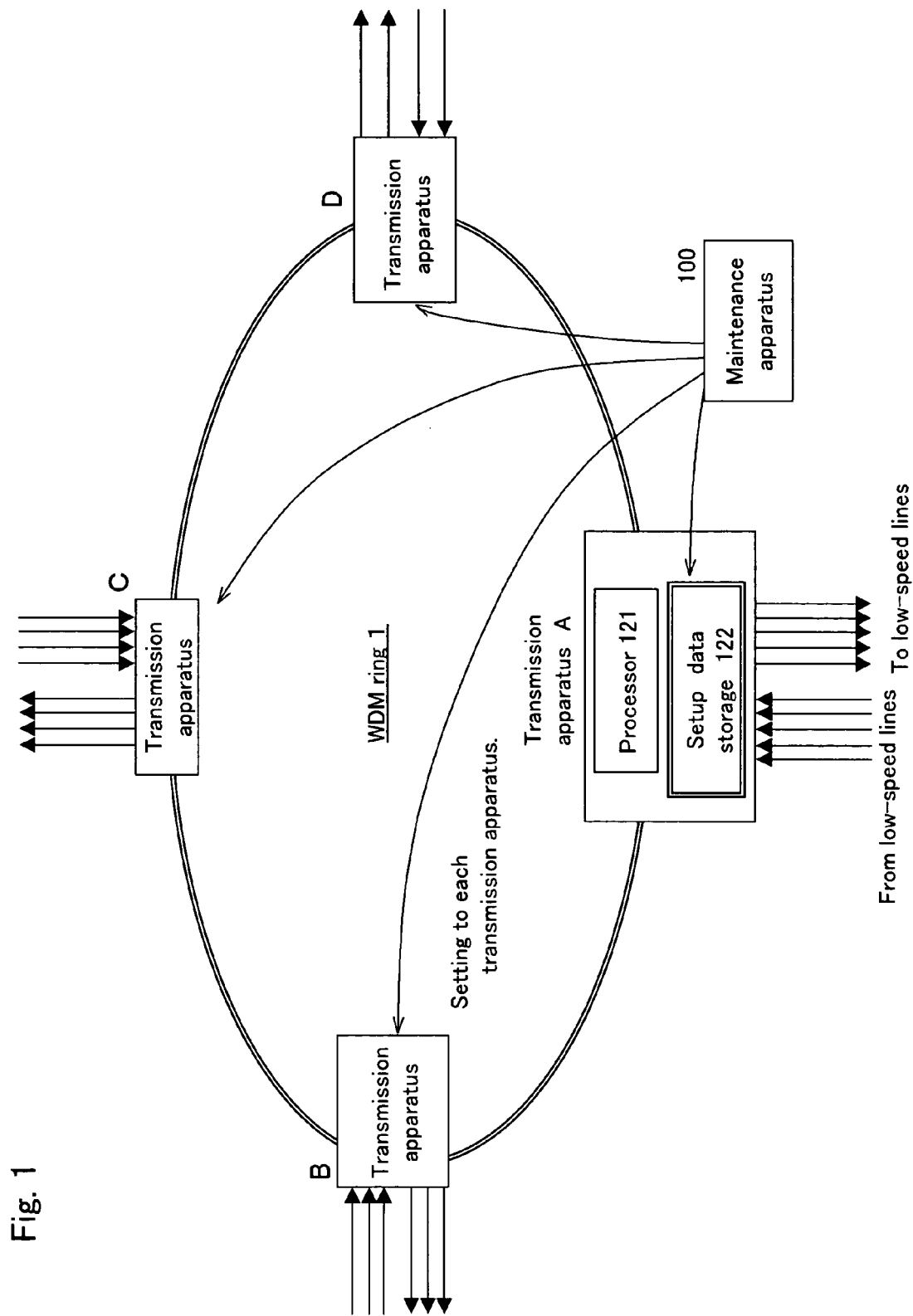
FIG. 1 shows an exemplary transmission network configuration including a plurality of WDM transmission apparatuses A-D.

In this figure, a transmission apparatus A in WDM ring 1, illustrated in FIG. 1, is shown. The transmission apparatus A is connected to the neighboring transmission apparatuses B, D through optical transmission lines 201, 212 which is included in WDM ring 1.

In FIG. 2, a wavelength-multiplexed optical signal output from a transmitting amplifier 101 in the transmission apparatus B in the preceding stage is input to a receiving amplifier 111 in the transmission apparatus A through optical transmission line 201. Output light 202 of receiving amplifier 111 is separated into transmitted light 203 and reflected light 204 by a first coupler 112.

An optical signal 205 having a predetermined wavelength is separated (dropped) from the reflected light 204 in a demultiplexing circuit 113, and then output as branching output signals 206 after wavelength-converted by a wavelength converter (transponder) 131.

Transmitted light 203 transmitted through the first coupler 112 is attenuated in a variable attenuator 114 to a predetermined level, and input to a second coupler 119. To the second coupler 119, an inserted light signal 210 having a predetermined wavelength is input. Here, the inserted light signal 210 is an output signal having a predetermined wavelength output from a wavelength multiplexing circuit 116, and is level-adjusted by a second variable attenuator 117. The inserted light signal 210 is then multiplexed with the above-mentioned transmitted light 203, and is output from the second coupler 119.

A multiplexed output 211 from the second coupler 119 is amplified in a transmitting amplifier 120, and forwarded to a transmission apparatus D in the succeeding stage through an optical transmission line 212.

In FIG. 2, a first and a second photodiodes 115, 118 respectively detect the output levels of variable attenuators 114, 117, and monitor the states.

Further, in the configuration of the transmission apparatus shown in FIG. 2, a processor 121 and a setup data storage 122 for storing the setting items of control data of the transmission apparatus are provided. In setup data storage 122, setting items of control data in the network described earlier are preserved.

Based on the control data (hereafter referred to as 'setup data') being set in setup data storage 122, level settings of the aforementioned variable attenuators 114, 117 are performed by processor 121. A maintenance operator 100 sets network control data into setup data storage 122 through processor 121.

In FIG. 2, each transmission apparatus are connected with LAN transmission lines 301, 302 to transmit control signals, which are provided separately from WDM ring 1 transmitting optical signals.

A feature of the present invention lies in a control method in which the network control data set and preserved in setup data storage 122 of one transmission apparatus A is inherited to other transmission apparatuses, based on a command from maintenance operator 100.

Now, an exemplary procedure in the embodiment of an inheritance control method of setup data in accordance with the present invention will be described hereafter.

Figure 3A:
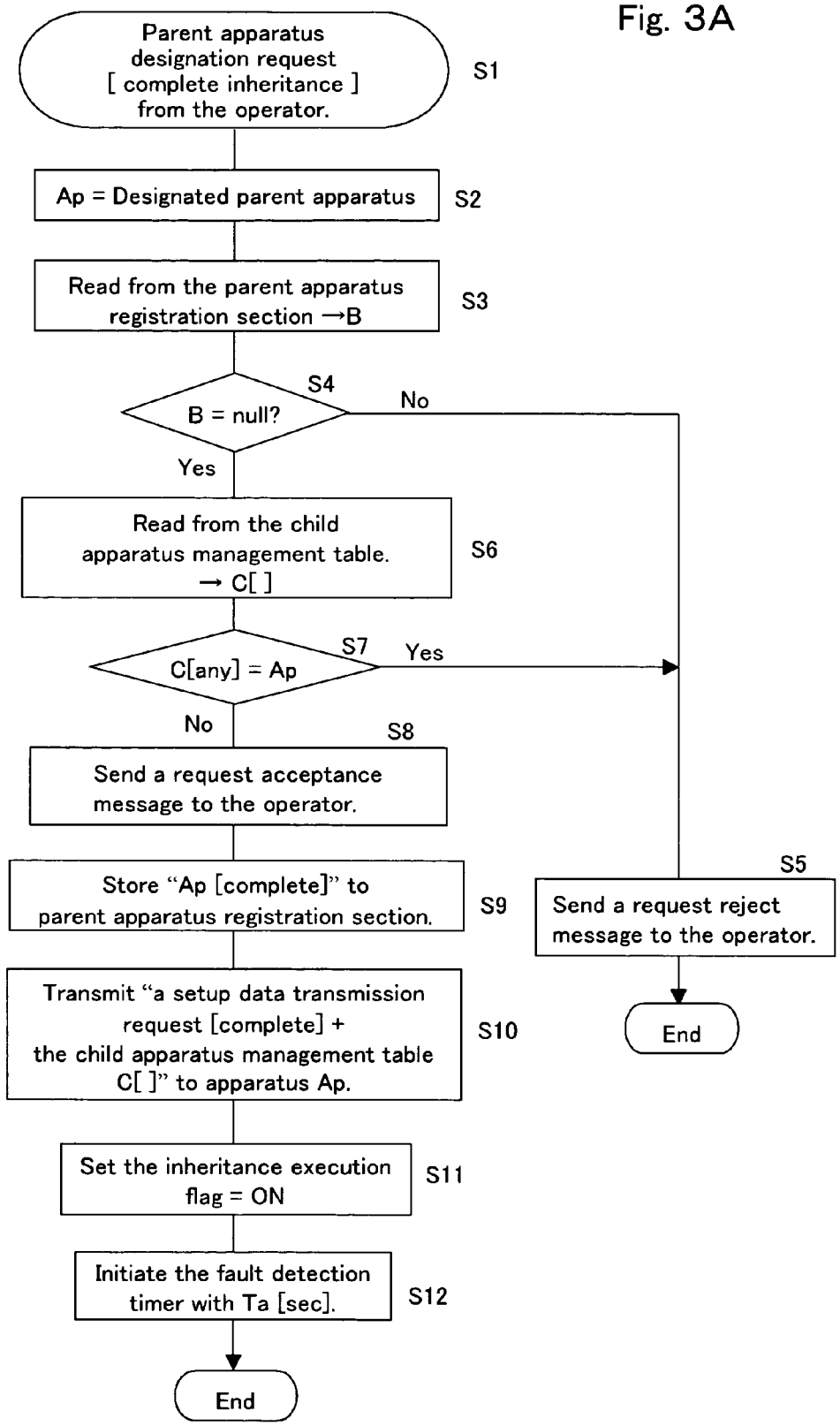
FIG. 3A shows a flowchart of request processing from the child apparatus side to the parent apparatus illustrating 'complete inheritance' in an inheritance control method of setup data according to the present invention.
Figure 4:
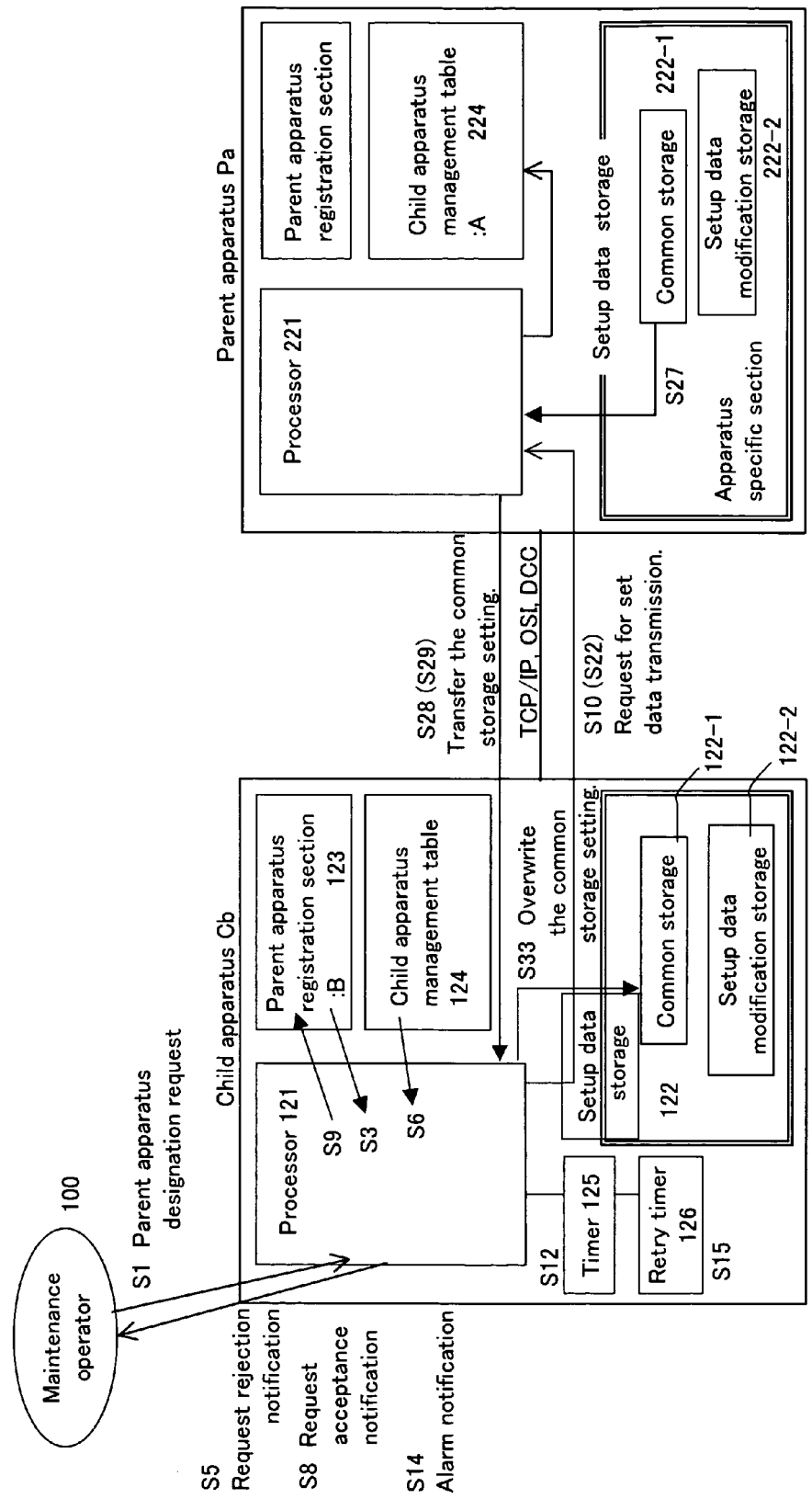
FIG. 4 shows a diagram illustrating relation between a transmission apparatus of copy source and a transmission apparatus of copy target, corresponding to the processing flowchart shown in FIG. 3A.

FIG. 3A shows a flowchart of request processing from the child apparatus side to the parent apparatus illustrating 'complete inheritance' by which the entire setup data is inherited from the parent apparatus initiated by maintenance operator 100, in the inheritance control method of the setup data according to the present invention. FIG. 4 shows a diagram illustrating the relation between a transmission apparatus functioning as copy source (hereafter referred to as parent apparatus Pa) and a transmission apparatus functioning as copy target (hereafter referred to as child apparatus Cb) correspondingly to the above processing flow.

Here, symbols assigned to the procedure steps in FIG. 4 correspond to the symbols of the procedure steps shown in FIG. 3A, which are applicable to the following description of the embodiments.

Referring to FIG. 4, when the child apparatus Cb receives a parent apparatus designation request (parent=Pa) input by maintenance operator 100 (step S1), processor 121 in the child apparatus Cb retains the designated parent apparatus Pa as an internal variable Ap (step S2). Processor 121 then reads a registration content B of a parent apparatus registration section 123 to verify a registered designation (step S3).

In the above verification, if any transmission apparatus including Ap has already been registered in the registration content B ('No' in step S4), processor 121 notifies rejection of the parent apparatus designation request to maintenance operator 100 (step S5), and the processing is terminated.

If no parent apparatus has been registered in parent apparatus registration section 123, processor 121 reads a list of a child apparatus management table 124, and refers to this list (step S6). In case the apparatus Cb of interest is acting as parent apparatus against another apparatus, the object apparatus should have been registered in this child apparatus management table 124, as a 'child apparatus' subordinate to the apparatus Cb of interest.

Accordingly, processor 121 checks whether the designated parent apparatus (=Ap) is already registered as child apparatus, using the list of child apparatus management table 124 having been read (step S7).

Here, if the designated parent apparatus Ap is found in the list of child apparatus management table 124 ('Yes' in step S7), this indicates that the transmission apparatus Cb of interest is already acting as parent apparatus of the designated apparatus Ap. In such a case, it is not possible to inherit the setup data from the designated parent apparatus Ap. Therefore, a reject message against the request is forwarded to maintenance operator 100 (step S5).

If the designated parent apparatus Ap is not found in the list of child apparatus management table 124, it is possible to inherit the setup data. Therefore, a message indicative of request acceptance is forwarded to maintenance operator 100 (step S8).

Next, 'complete inheritance' is registered in parent apparatus registration section 123, together with an IP address of the designated parent apparatus Ap (step S9) Also, to the registered IP address of the parent apparatus Ap, a setup data transmission request and the content of child apparatus management table 124 are transmitted, using a predetermined network protocol for interchanging control signals (such as TCP/IP, OSI: Open Systems Interconnection, DCC: Data Communication Channel) (step S10).

At this time, in order to complete the inheritance procedure from the parent apparatus Ap within a predetermined time Ta (sec), processor 121 sets an inheritance execution flag ON in setup data storage 122 (step S11), and initiates a fault detection timer (set value Ta) 125 (step S12).

Figure 5:
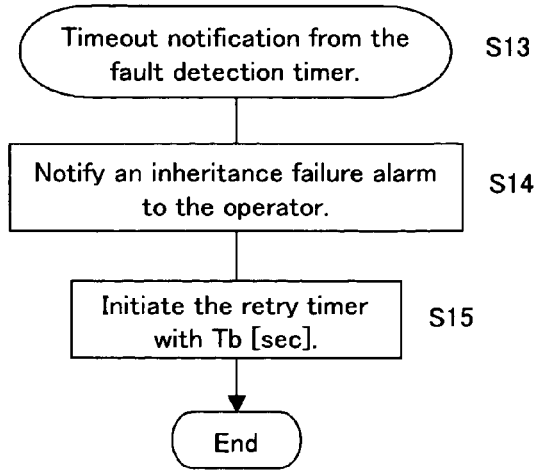
FIG. 5 shows a processing flowchart on the occurrence of timeout in a fault detection timer (set value Ta) 125.

FIG. 5 shows a processing flowchart performed on the occurrence of timeout in a fault detection timer (set value Ta) 125. In FIG. 5, when Ta of the fault detection timer is timed out, on receiving this information (step S13), processor 121 issues an inheritance failure alarm to maintenance operator 100 (step S14). Next, processor 121 sets a retry timer 126 with a set value Tb (sec), and initiates this retry timer 126 (step S15).

Figure 6:
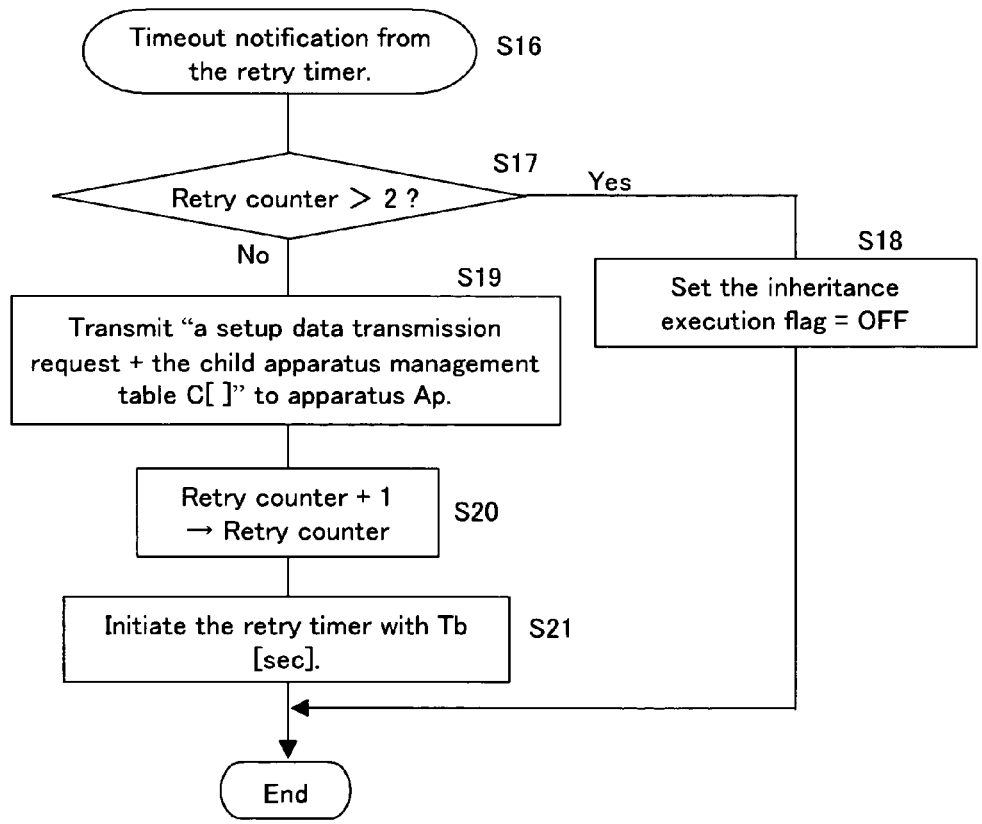
FIG. 6 shows a processing flowchart on the occurrence of timeout in a retry timer 126 having a setting value Tb.

FIG. 6 shows a processing flowchart performed when the set value Tb in retry timer 126 is timed out.

When processor 121 receives a timeout notification of retry timer 126 (step S16), if the number of timeouts for the retry counter is 2 or more (Yes in step S17), processor 121 terminates the processing after setting OFF the inheritance execution flag in setup data storage 122 (step S18).

On the other hand, if retry timer 126 is less than 2 (No in step S17), processor 121 transmits again a set up data transmission request, together with the content of child apparatus management table 124, to the parent apparatus Ap using the registered IP address (step S19). At this time, the retry counter is incremented by 1 (step S20), and retry timer 126 is set to Tb (step S21).

Figure 3B:
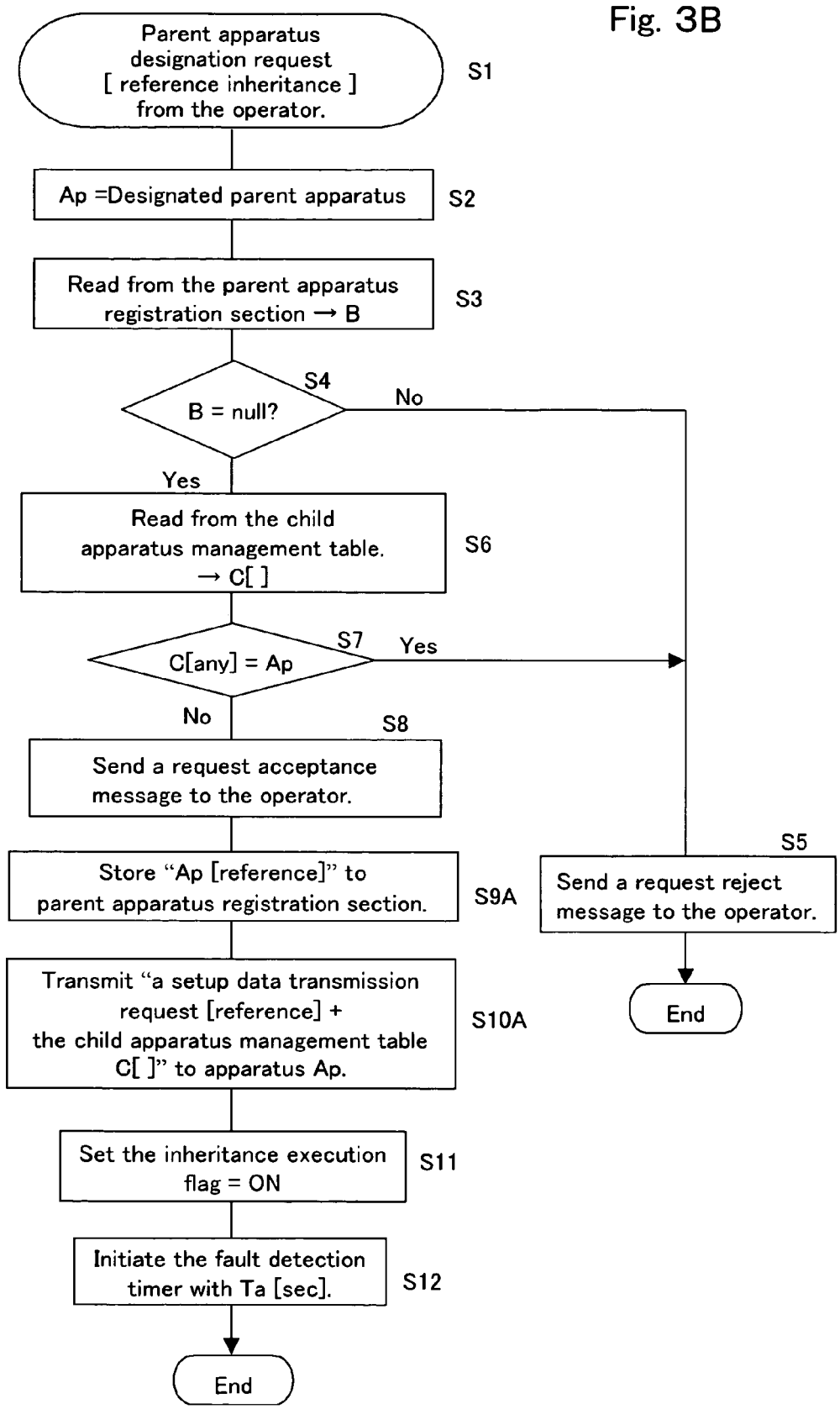
FIG. 3B shows a flowchart of request processing from the child apparatus side to the parent apparatus illustrating 'reference inheritance' in an inheritance control method of setup data according to the present invention.

In the above processing flowchart shown in FIG. 3A, the case of completely inheriting the setup data in the parent apparatus Pa (i.e. the case of complete inheritance) has been described. However, it is also possible to refer to, and update, only a portion of the setup data having been modified. In such a case, a request for 'reference inheritance' is designated from maintenance operator 100, instead of a request for 'complete inheritance' (step S1 in FIG. 3B). This FIG. 3B shows an operation flowchart corresponding to the case that the 'reference inheritance' is requested. In the processing step shown in FIG. 3B corresponding to S9 in FIG. 3A, instead of complete inheritance, reference inheritance is registered when registering into parent apparatus registration section 123 (step S9A). Also in the step corresponding to S10, a setup data transmission request to the parent apparatus Ap is specified as 'reference' (step S10A). Other processing steps are similar to those shown in FIG. 3A.

Figure 7A:
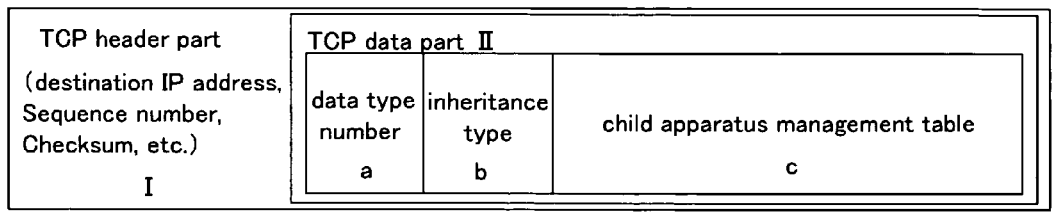
FIGS. 7A, 7B show diagrams illustrating exemplary data structures transmitted and received among each apparatus.
Figure 7B:
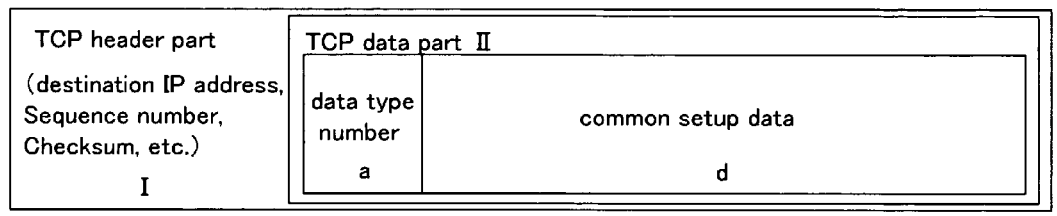

Now, FIGS. 7A, 7B show exemplary data structures interchanged between each of the above-mentioned apparatuses.

FIG. 7A shows a data structure of a setup data transmission request to the parent apparatus Pa. Subsequently to TCP header part I, TCP data part II includes: (a) a data type number having the number indicating the setup data transmission request (1 byte); (b) a inheritance type having the identification of either the complete inheritance or the reference inheritance (1 byte) ; and (c) a child apparatus management table which includes the content of the child apparatus management table (variable size).

FIG. 7B shows a data structure of a common setup data transferred from the inheritance source (parent apparatus) and stored to a common storage, which will be explained later. Following TCP header part I, TCP data part II includes: (a) a data type number, which is the number indicating common setup data transfer (1 byte); and (d) a common setup data part, which includes the common setup data (variable size).

Figure 7C:
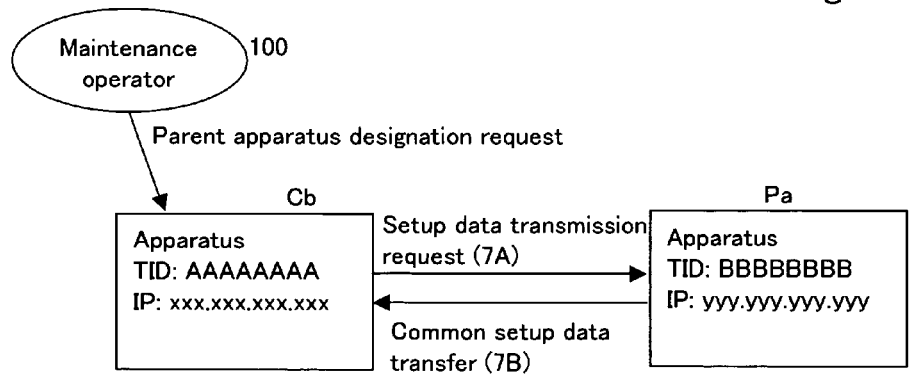
FIG. 7C shows transmission and reception of control data between transmission apparatuses.

In the header part I of these data structures, as shown in FIG. 7C, ID and IP address of the destination apparatus designated by maintenance operator 100 are attached. The setup data transmission request is transmitted from the child apparatus Cb to the parent apparatus Pa, using the data structure shown in FIG. 7A. The common setup data is transferred from the parent apparatus Pa to the child apparatus Cb, using the data structure shown in FIG. 7B.

Figure 8:
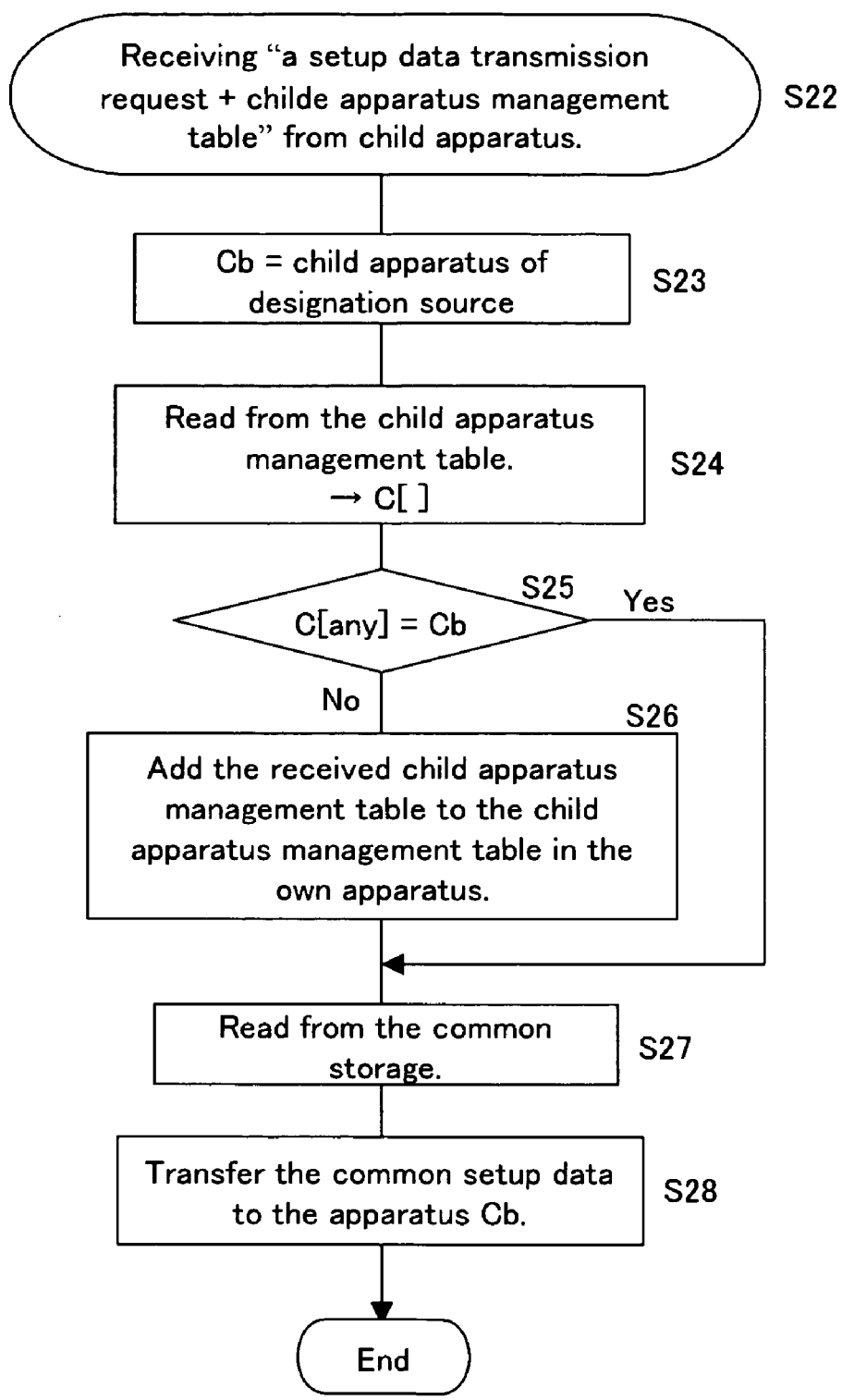
FIG. 8 shows a processing flowchart of a parent apparatus Ap performed on receipt of a setup data transmission request from a child apparatus Cb.

FIG. 8 shows a processing flow on the parent apparatus Ap side, performed when the parent apparatus Ap receives the set up data transmission request from the child apparatus Cb.

In a processor 221 of the parent apparatus Ap (refer to FIG. 4), on receipt of the setup data transmission request and the child apparatus management table from the child apparatus Cb (step S22), processor 221 identifies the child apparatus number Cb of the designation source (step S23)

Based on the identified child apparatus number Cb, processor 221 reads the list of child apparatus management table 224 (step S24), and checks whether or not the above-mentioned child apparatus number Cb is found in the list (step S25).

If the above child apparatus number Cb is found in the list (Yes in step S25), processor 221 reads the setup data stored in a common storage 222-1 of a setup data storage 222 (step S27). Processor 221 then transfers the setup data in the common storage to the corresponding child apparatus Cb (step S28). Thus, the processing in the parent apparatus Ap is completed.

On the other hand, if the above-mentioned child apparatus number Cb is not found in the list (No in step S25), processor 221 adds the received child apparatus management table to child apparatus management table 224 of the own parent apparatus (step S26). Thereafter, processor 221 performs the processing of the step S27 and the subsequent steps.

Figure 9A:
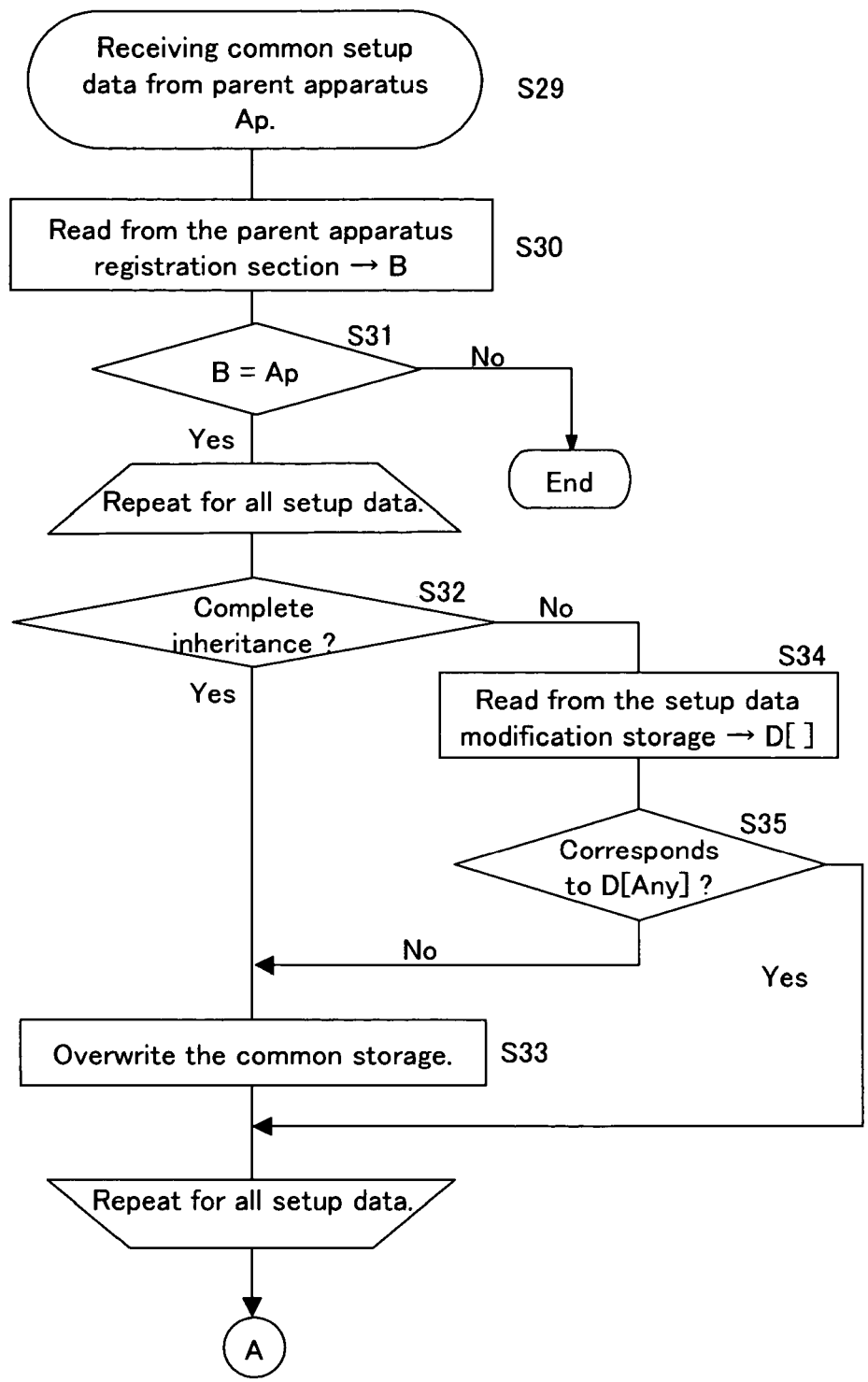
FIGS. 9A, 9B show an operation flowchart (part 1 and part 2, respectively) of the processing performed in a child apparatus Cb for the setup data transmitted from a parent apparatus Ap, as a result of the processing shown in FIG. 8.
Figure 9B:
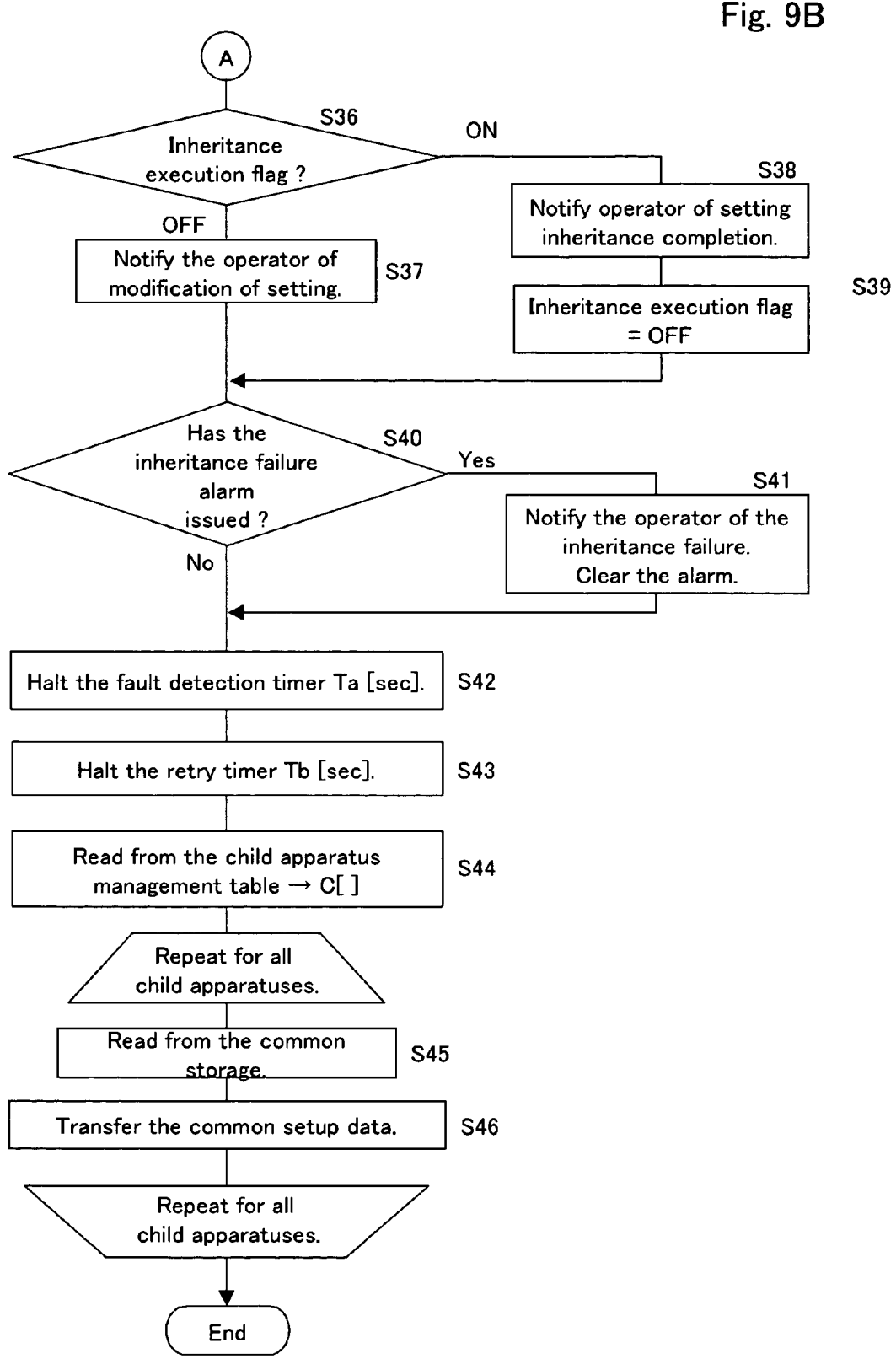

FIGS. 9A, 9B show operation flowcharts of the processing performed in the child apparatus Cb for the setup data transmitted from a parent apparatus Ap as a result of the processing shown in FIG. 8.

When processor 121 (FIG. 4) in the child apparatus Cb receives the setup data in common storage (namely, common setup data) of parent apparatus Ap transferred from processor 221 (step S29), processor 121 reads the registration content registered in parent apparatus registration section 123 (step S30).

If this parent apparatus registration content is not the parent apparatus Ap, then the processing is terminated (No in step S31). If the content is the parent apparatus Ap (Yes in step S31), the following processing is repeated for the entire setting items. Namely, processor 121 verifies whether 'complete inheritance' is designated (step S32). If the 'complete inheritance' is verified, the content in a common storage 122-1 is overwritten by the data transmitted from the parent apparatus Ap (step S33).

On the other hand, if the 'reference inheritance' is designated instead of the 'complete inheritance' (No in step S32), processor 121 reads a modification list stored in a setup data modification storage 122-2 of setup data storage 122 (step S34), and checks whether the setting modification proper to the child apparatus has been performed (step S35).

If a data item is included in the modification list, which means the data item is modified proper to the child apparatus, the setup data corresponding to that data item transmitted from the parent apparatus is ignored (Yes in step S35). On the other hand, if the modification list content does not have the data item having been modified proper to the child apparatus (No in step S35), processor 121 overwrites common storage 122-1 using the setup data of the parent apparatus Ap, and thus the setup data of the parent apparatus Ap is inherited (step S33).

Subsequently, in FIG. 9B, processor 121 checks whether the inheritance execution flag stored in setup data storage 122 is ON or OFF (step S36). If the inheritance execution flag is OFF, the setting modification is notified to maintenance operator 100 (step S37).

If the inheritance execution flag is ON (ON in step S36), processor 121 informs maintenance operator 100 of the completion of setting inheritance (step S38), and sets the inheritance execution flag OFF (step S39).

In the course of the above processing, if the inheritance failure alarm has issued (Yes in step S40), processor 121 informs maintenance operator 100 of the cancellation of the inheritance failure alarm (step S41), halts the fault detection timer 125 of which the set value was Ta (step S42), and halts the set value in the retry timer 126 of which the set value was Tb (step S43).

Next, processor 121 reads the registration list in child apparatus management table 124 (step S44). The following processing is repeated for the entire child apparatuses registered in the registration list.

Namely, processor 121 reads the content of the updated common storage 122-1 (step S45), and transfers the setup data to the corresponding child apparatuses registered in the registration list (step S46).

Figure 10:
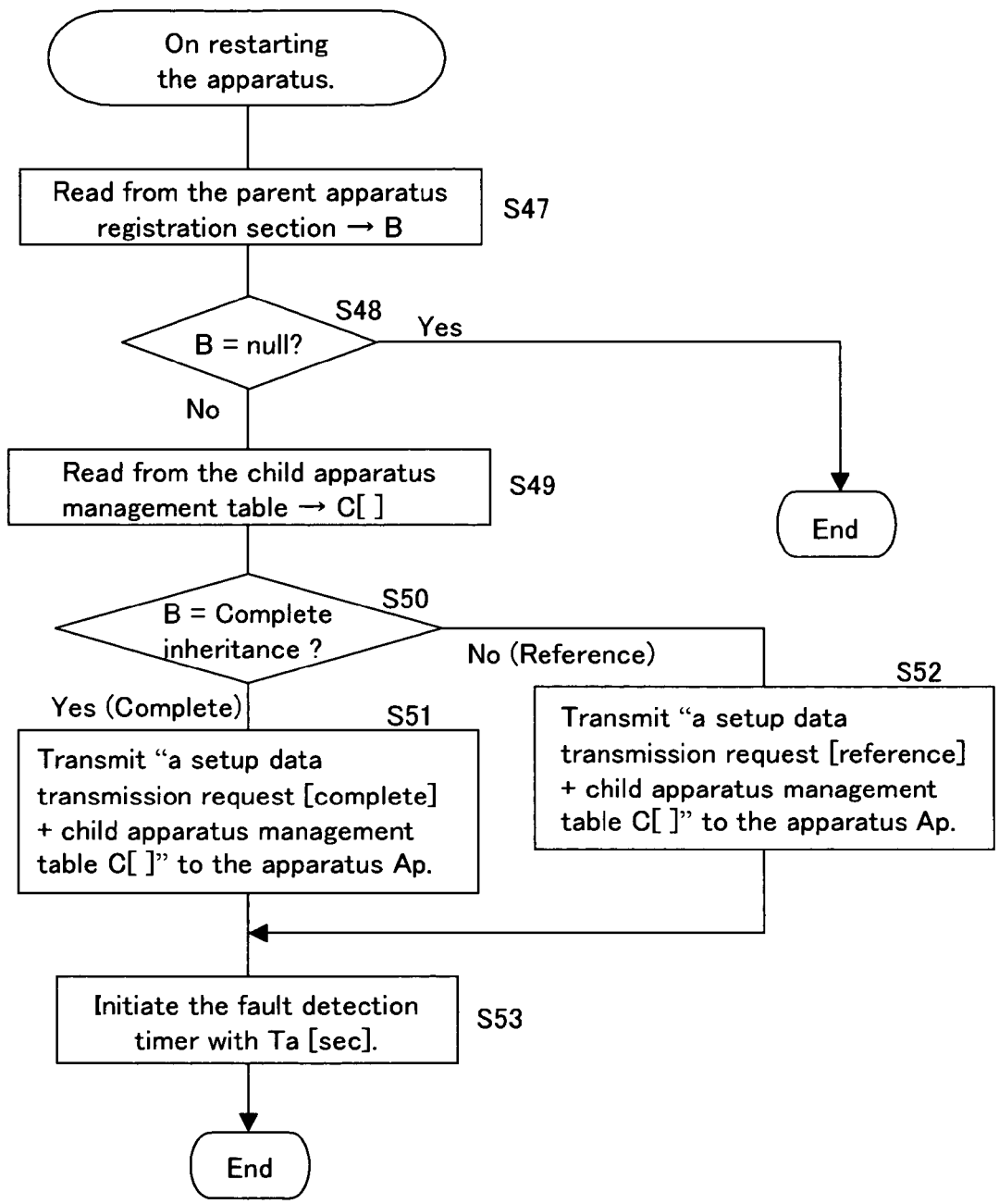
FIG. 10 shows a processing flowchart performed when a transmission apparatus is restarted because of a certain reason.

FIG. 10 shows a processing flowchart performed when the transmission apparatus is restarted for some reason. On restarting, processor 121 reads the registration content in parent apparatus registration section 123 (step S47). If no information is registered, the processing is terminated (Yes in step S48).

If information is registered (No in step S48), processor 121 reads in child apparatus management table 124 (step S49). If 'complete inheritance' is designated (Yes in step S50), processor 121 transmits to parent apparatus Ap a setup data transmission request for 'complete inheritance' and a list in child apparatus management table 124 (step S51). If 'reference inheritance' is designated (No in step S50), processor 121 transmits a setup data transmission request for 'reference inheritance' and the list in child apparatus management table 124, to parent apparatus Ap (step S52).

On transmitting to parent apparatus Ap the setup data transmission request for 'complete inheritance', or the request for 'reference inheritance', together with the list in child apparatus management table 124, processor 121 initiates fault detection timer 125 with the set value Ta, in a similar way to the processing step S12 shown in FIGS. 3A, 3B (step S53).

Figure 11:
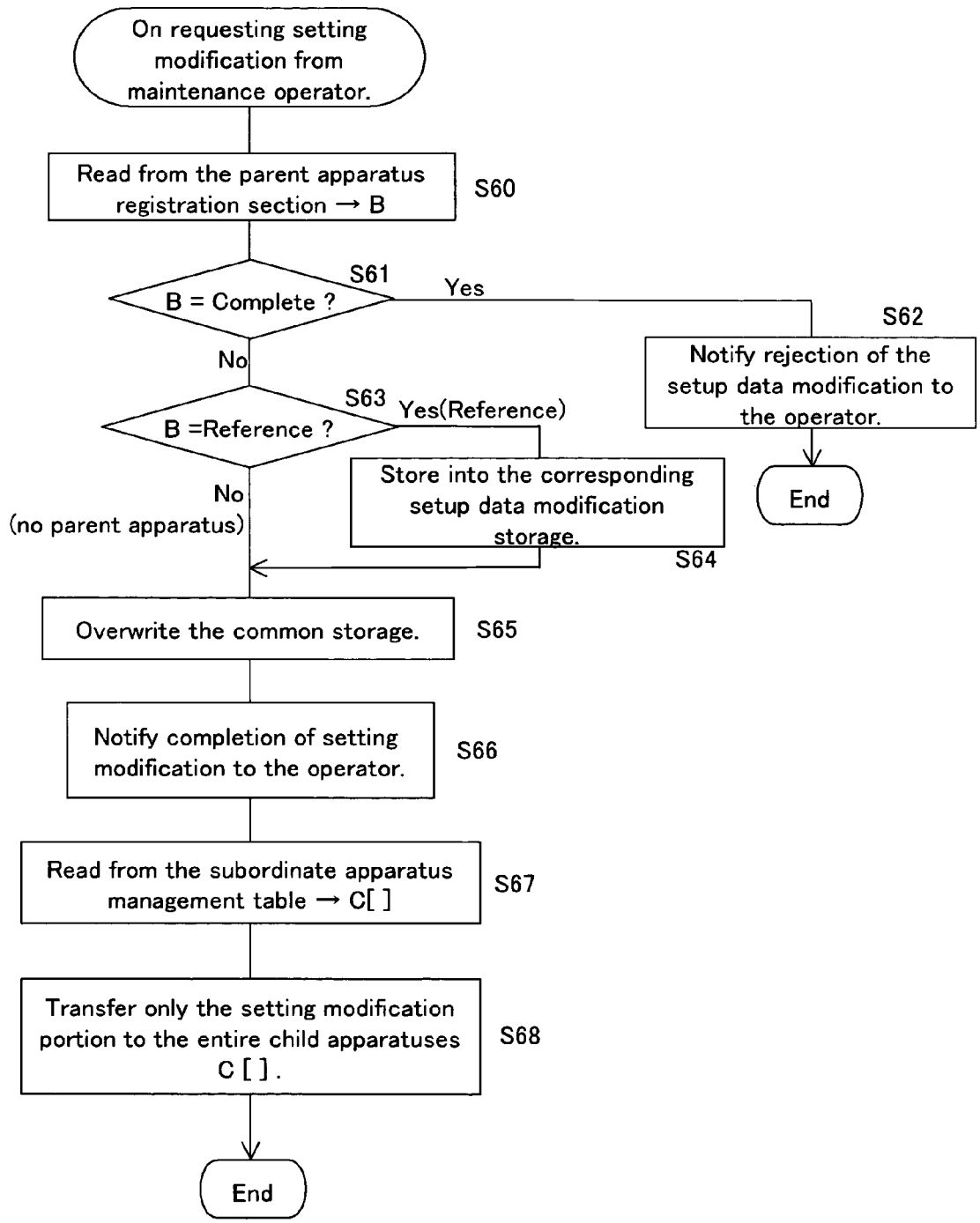
FIG. 11 shows a processing flowchart performed at the time of a setup data modification request from a maintenance operator.

FIG. 11 shows an exemplary processing flowchart performed when a request for modifying the setting is initiated from maintenance operator 10.0 during network operation.

When the setup data modification request is initiated from the maintenance operator, processor 121 reads out the registration content (B) registered in parent apparatus registration section 123 (step S60), and checks whether the complete inheritance (step S61) or the reference inheritance (step S63) is specified.

If the complete inheritance is specified (Yes in step S61), rejection of the setup data modification request is notified to the operator 100 (step S62). Meanwhile, if the reference inheritance is specified (Yes in step S63), the corresponding modification is written into setup data modification storage 122-2 (step S64).

In case of neither complete inheritance (No in step S61) nor reference inheritance (No in step S63), and when the modification is written into setup data modification storage 122-2 (step S64), processor 121 overwrites common storage 122-1 (step S65).

Next, processor 121 informs maintenance operator 100 of the completion of the setting modification (step S66). Further, processor 121 reads child apparatus management table 124 (step S67), and transfers only a portion to be modified, as the control data for setting, to the entire child apparatuses having been registered in child apparatus management table 124 (step S68). With this, by setting to an upper-level apparatus from maintenance operator 100, the identical data can accurately be set to the entire apparatuses subordinate to the upper-level apparatus instantaneously at a time.

Figure 12:
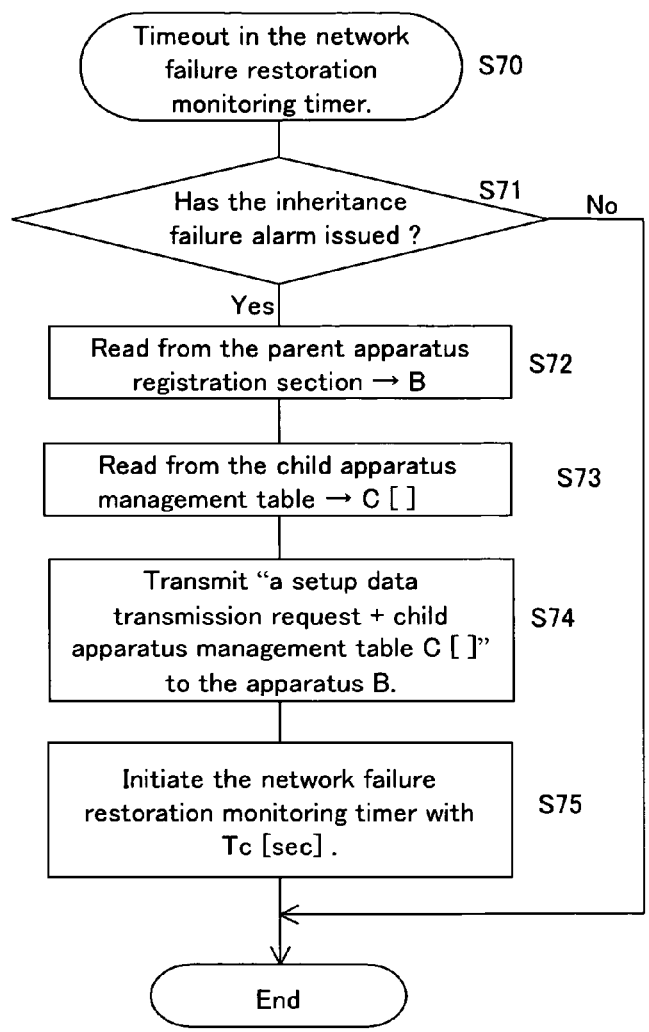
FIG. 12 shows a diagram illustrating processing performed when a timeout occurs during network failure restoration.

Now, FIG. 12 shows a processing flow of a retry operation performed when the inheritance setting is disabled because of a network failure.

Triggered by the timeout of a non-illustrated network restoration monitoring timer, which is similar to fault detection timer 125 shown in FIG. 4 (step S70), in case that the inheritance failure alarm is generated against the inheritance processing having been initiated (Yes in step S71), processor 121 reads information of the parent apparatus registered in parent apparatus registration section 123 (step S72). Further, processor 121 reads the child apparatus list in child apparatus management table 124 (step S73). Processor 121 then transmits a setup data transmission request, together with the content of child apparatus management table 124, to the parent apparatus registered in parent apparatus registration section 123, and initiates retrying the inheritance setting (step S74).

On transmitting the content of child apparatus management table 124, processor 121 initiates the aforementioned network restoration monitoring timer with a predetermined timer time Tc (step S75). By repeating the processing steps S70-S75, even when the setting inheritance cannot be performed temporarily caused by a network failure, the user (maintenance operator) can perform setting to the upper level transmission apparatus as usual, and the setting can automatically be conveyed to other child apparatuses on restoration of the failure. Additionally, the timer time Tc initiated in the above step S75 is set longer than the time set in retry timer 126 illustrated in FIG. 4.

Figure 13:
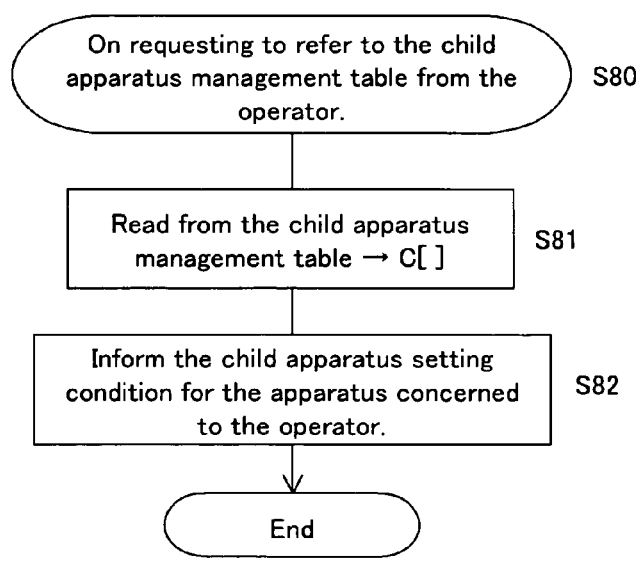
FIG. 13 shows a diagram illustrating processing performed at the time of a request for referring to a child apparatus management table.

FIG. 13 shows an operation flow for the maintenance operator to grasp the setup data of the child apparatus maintained in the parent apparatus. The maintenance operator issues a request for referring to child apparatus management table 224 to the parent apparatus (step S80). The apparatus having received the request reads the content of child apparatus management table 224, which is a registered list of the apparatuses subordinate to the apparatus of interest (step S81), and reports the list contents as a response to the request from the maintenance operator (step S82).

With the above processing, the maintenance operator can grasp the setup data of child apparatuses maintained in the parent apparatus at any time.

Figure 14:
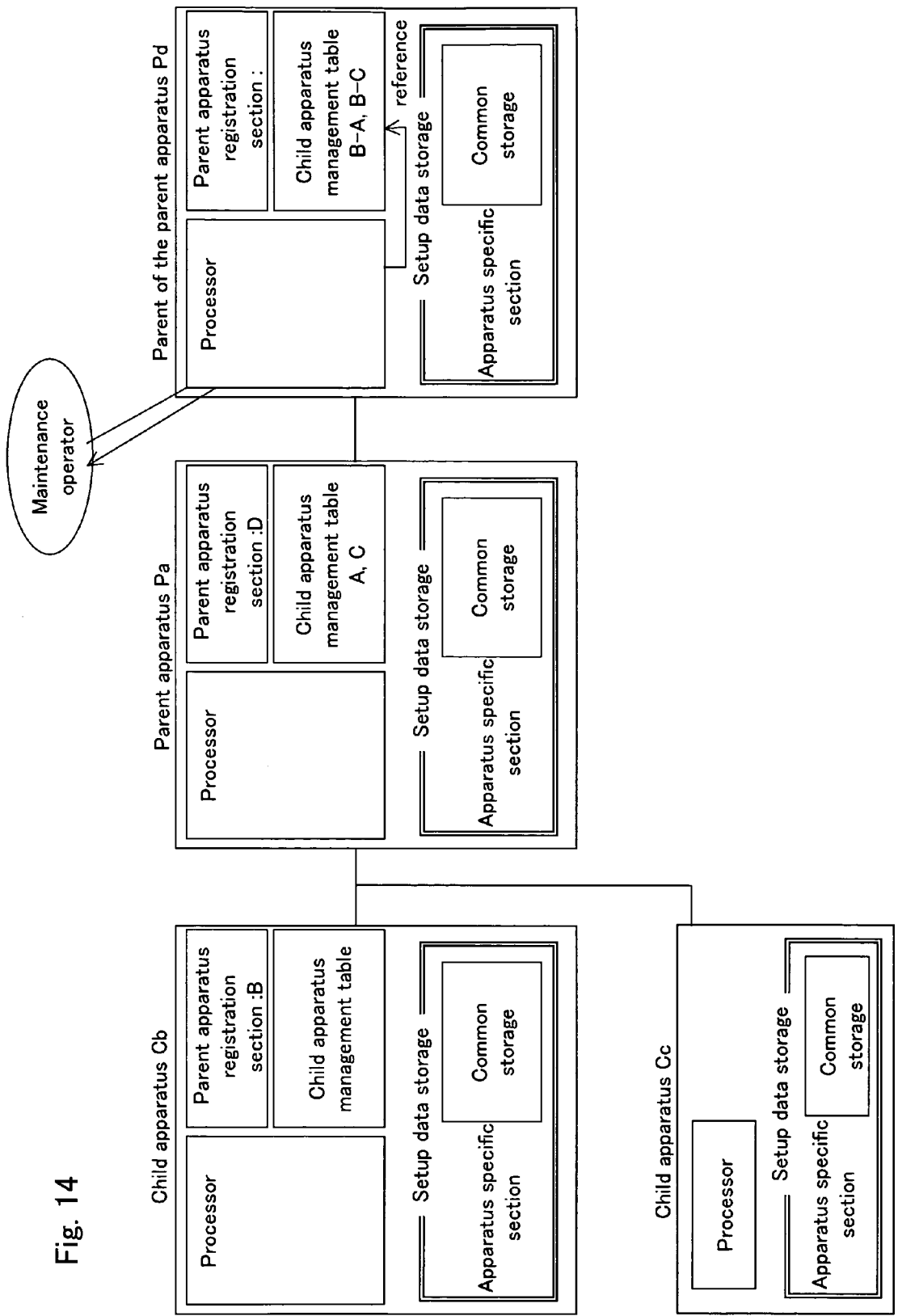
FIG. 14 shows a diagram illustrating another embodiment of the present invention.

FIG. 14 shows another embodiment of the present invention. In the foregoing embodiments having been described, the parent apparatus and the child apparatus are connected with a single-stage parent-child relationship. In contrast, according to the embodiment shown in FIG. 14, a parent apparatus Pd acting as a parent to the parent apparatus Pa is connected further. Also, in FIG. 14, a child apparatus Cc is connected in parallel with the child apparatus Cb to the parent apparatus Pa.

The inheritance operation between the parent apparatus Pa and the child apparatus Cc is similar to the inheritance operation between the parent apparatus Pa and the child apparatus Cb explained in the above description.

With reference to FIGS. 15A, 15B, features and merits of the inheritance operation when the apparatuses are connected with a two-stage parent-child relationship can be explained.

Namely, FIG. 15A shows a single-stage parent-child relationship according to the operation illustrated with reference to FIG. 3. In contrast, FIG. 15B shows an example of two stage connections: To a child apparatus D connected to a parent apparatus A, child apparatuses E, F are connected further, as subordinates to the apparatus D.

In FIG. 15A, to the parent apparatus A, five child apparatuses B-F are connected in parallel. Upon request from maintenance operator 100, the setup data in the parent apparatus A is inherited to the child apparatuses B-F. In this case, individual modification of the setting is performed to the child apparatuses D, E, F, under instructions from maintenance operator 100.

In contrast, in the configuration shown in FIG. 15B, the setup data of the parent apparatus A is inherited to the child apparatuses B, C, D, and the modification setting is performed to apparatus D from maintenance operator 100, and then the setup data of the child apparatus D is inherited to the child apparatuses E, F.

To summarize, the merits of the multistage configuration shown in FIG. 15B, as compared with the configuration of FIG. 15A, will be described below.

Using a transmission apparatus which is designed to fit in usage or condition after setting change, the more various circumstances a single transmission apparatus is intended to be adapted to, the more an amount of setting items increases, which will produce an increased setting workload.

As having been described earlier, in a communication system having a plurality of transmission apparatuses, it is necessary to set data individually into transmission apparatuses. With an increased number of the transmission apparatuses, setting workload increases.

In case a similar setting is to be performed for a plurality of transmission apparatuses, if the setup data for a certain transmission apparatus can be inherited (copied) to other transmission apparatuses, the workload can remarkably be reduced.

In the example shown in FIG. 15A, when setting into the transmission apparatuses A-F; (1) in advance setup data is set in the transmission apparatus A, and the setup data for the transmission apparatus A is inherited to the other transmission apparatuses B-F; and, (2) for the transmission apparatuses D-F having differences in the settings, modification setting is to be performed only for the differences.

With this method, when the transmission apparatuses B, C have identical settings to the transmission apparatus A, it becomes unnecessary for maintenance operator 100 to set into the transmission apparatuses B, C independently, which remarkably reduces the setting work. Further, as to the transmission apparatuses D-F, if there are partially identical setting items among them, it becomes unnecessary to set these items individually, which also reduces the workload.

Further, in case that the settings can be grouped into a few types, by inheriting the setting with the multistage configuration as shown in FIG. 15B, the workload can be reduced more.

In the example shown in FIG. 15A, the transmission apparatuses D-F have identical settings. As such, when the setting types can be grouped (one group having the transmission apparatuses A-C, and the other group the transmission apparatuses D-F), as shown in FIG. 15B; in advance setup data is set in the transmission apparatus A, and (1) the setup data in the transmission apparatus A is inherited to the transmission apparatuses B, C, D belonging in the first group; (2) as to the transmission apparatus D having differences in the settings, the setup data of the transmission apparatus D is modified only for the differences concerned; and (3) the setup data in the transmission apparatus D is inherited to the transmission apparatuses E, F.

In this example, it becomes unnecessary for maintenance operator 100 to set to the transmission apparatuses E, F having the identical settings to the transmission apparatus D, which reduces the workload. As a possible example of grouping by the setting types in a practical field, there is a case of setting data into a WDM transmission apparatus.

In the WDM transmission apparatus, a single transmission apparatus is applied to a station in which a low-speed signal is added/dropped to/from a WDM ring, or a relay station in which only light amplification is performed within the WDM ring. In most cases, a setup data type for the ADD/DROP station is largely different from that for the relay station, while the setting is similar within an identical group. Therefore, the multistage inheritance setting is effective for the purpose of obtaining a great degree of reduction in the setting workload.

INDUSTRIAL APPLICABILITY

As described above, according to the present invention, by setting apparatus control data into an upper-level transmission apparatus, the identical data can accurately be set into the entire transmission apparatuses subordinate to the upper-level transmission apparatus instantaneously at a time, which leads to obtaining improved maintenance operation. With this, efficient maintenance and improved system stability can be brought in the communication system. In this sense, contribution to the industry can greatly be expected.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A method for controlling to transfer and set control data in a plurality of transmission apparatuses installed in a ring network over a predetermined protocol, wherein each of the plurality of transmission apparatuses has a parent apparatus registration section and a child apparatus management table, the method in each of the plurality of transmission apparatuses comprising:

retaining information of whether any transmission apparatus is registered as a parent apparatus for a concerned transmission apparatus in the parent apparatus registration section of the concerned transmission apparatus;

retaining information of whether the concerned transmission apparatus is registered as a parent apparatus for any transmission apparatus in the child management table of the concerned transmission apparatus; and requesting by a processor of the concerned transmission apparatus to a parent apparatus designated by the maintenance operator to transfer the control data stored in the storing unit of the patent apparatus, to the concerned transmission apparatus, when no transmission apparatus is registered in the parent apparatus registration section of the concerned transmission apparatus, and the designated parent apparatus is not included in the child apparatus management table of the concerned transmission apparatus, wherein:

in a transmission apparatus designated as the parent apparatus when modifying control data set in the parent apparatus, if the control data is an object for inheritance, the parent apparatus transmits a portion of the control data having been modified to all transmission apparatuses registered as a child apparatus in the child apparatus management table, and on receipt of the control data portion having been modified, each of the transmission apparatuses registered as child apparatus overwrites the received control data portion on the corresponding portion.

2. A method for controlling to transfer and set control data in a plurality of transmission apparatuses installed in a ring network over a predetermined protocol, wherein each of the plurality of transmission apparatuses has a parent apparatus registration section and a child apparatus management table, the method in each of the plurality of transmission apparatuses comprising:

retaining information of whether any transmission apparatus is registered as a parent apparatus for a concerned transmission apparatus in the parent apparatus registration section of the concerned transmission apparatus;

retaining information of whether the concerned transmission apparatus to a parent apparatus designated by the maintenance operator to transfer the control data stored in the storing unit of the patent apparatus, to the concerned transmission apparatus, when no transmission apparatus is registered in the parent apparatus registration section of the concerned transmission apparatus, and the designed parent apparatus is not included in the child apparatus management table of the concerned transmission apparatus, wherein:

when the inheritance of the control data fails because of a network failure, an inheritance failure alarm is notified to the maintenance operator, when the network failure is restored, the concerned transmission apparatus registered as child apparatus transmits the child apparatus management table managed by the concerned transmission apparatus to the parent apparatus, and the parent apparatus retransmits the control data having been set therein to the concerned transmission apparatus, and on completion of the retransmission, the inheritance failure alarm is cleared.

3. The method according to claim 1, wherein:

when the inheritance of the control data fails because of a network failure, an inheritance failure alarm is notified to the maintenance operator, when the network failure is restored, the concerned transmission apparatus, registered as a child apparatus, transmits the child apparatus management table managed by the concerned transmission apparatus to the parent apparatus, and the parent apparatus retransmits the control data having been set therein to the concerned transmission apparatus, and on completion of the retransmission, the inheritance failure alarm is cleared.

4. A method for controlling to transfer and set control data in a plurality of transmission apparatuses installed in a ring network over a predetermined protocol, wherein each of the plurality of transmission apparatuses has a parent apparatus registration section and a child apparatus management table, the method in each of the plurality of transmission apparatuses comprising:

retaining information of whether any transmission apparatus is registered as a parent apparatus for a concerned transmission apparatus in the parent apparatus registration section of the concerned transmission apparatus;

retaining information of whether the concerned transmission apparatus is registered as a parent apparatus for any transmission apparatus in the child management table of the concerned transmission apparatus; and requesting by a processor of the concerned transmission apparatus to a parent apparatus designated by the maintenance operator to transfer the control data stored in the storing unit of the patent apparatus, to the concerned transmission apparatus, when no transmission apparatus is registered in the parent apparatus registration section of the concerned transmission apparatus, and the designated parent apparatus is not included in the child apparatus management table of the concerned transmission apparatus, wherein:

when the parent apparatus is designated, a distinction between complete inheritance, which represents the inheritance of the entire control data to be inherited from the parent apparatus, and reference inheritance, which represents updating only the modified portion by reference, is executed.

* * * * *